United States Patent
Fan et al.

(10) Patent No.: US 9,372,977 B2
(45) Date of Patent: Jun. 21, 2016

(54) SCREEN UNLOCKING METHOD, DEVICE AND TERMINAL

(71) Applicant: ZTE Corporation, Shenzhen (CN)

(72) Inventors: Xiaoli Fan, Shenzhen (CN); Fangfang Liao, Shenzhen (CN); Qi Zhou, Shenzhen (CN); Guoqiang Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/434,776

(22) PCT Filed: Jul. 11, 2013

(86) PCT No.: PCT/CN2013/079224
§ 371 (c)(1),
(2) Date: Apr. 10, 2015

(87) PCT Pub. No.: WO2013/182119
PCT Pub. Date: Dec. 12, 2013

(65) Prior Publication Data
US 2015/0269374 A1    Sep. 24, 2015

(30) Foreign Application Priority Data

Oct. 12, 2012 (CN) .......................... 2012 1 0387777

(51) Int. Cl.
*H04M 3/16* (2006.01)
*G06F 21/34* (2013.01)
(Continued)

(52) U.S. Cl.
CPC ................ *G06F 21/34* (2013.01); *G06F 21/31* (2013.01); *H04L 9/0894* (2013.01); *H04L 63/083* (2013.01); *H04W 12/04* (2013.01); *H04W 12/06* (2013.01); *G06F 2221/2131* (2013.01)

(58) Field of Classification Search
CPC . G06F 21/31; G06F 21/34; G06F 2221/2131; H04L 63/083; H04L 9/0894; H04W 12/04; H04W 12/06

USPC .............. 455/410–411, 414.1, 423, 418–420, 455/550.1, 565–566, 557–558; 380/247–250
See application file for complete search history.

(56) References Cited

U.S. PATENT DOCUMENTS

| | | | | |
|---|---|---|---|---|
| 2008/0125084 A1* | 5/2008 | Cambois | ............... | H04W 88/02 455/411 |
| 2011/0159844 A1 | 6/2011 | Gillet et al. | | |
| 2013/0024932 A1* | 1/2013 | Toebes | .................... | G06F 21/31 726/19 |

FOREIGN PATENT DOCUMENTS

| | | |
|---|---|---|
| CN | 102096546 A | 6/2011 |
| CN | 102708324 A | 10/2012 |

(Continued)

OTHER PUBLICATIONS

Google Device Policy for Google Apps, Aug. 11, 2012, Jeff Taylor, www.thedroidlawyer.com, 5 pages.
Device Administration/Android Developers, Nov. 6, 2015, Device Administration, www.developer.android.com, 10 pages.
International Search Report of PCT/CN2013/079224 dated Oct. 17, 2013.

*Primary Examiner* — Babar Sarwar
(74) *Attorney, Agent, or Firm* — Banner & Witcoff

(57) ABSTRACT

A screen unlocking method, device and terminal, wherein the method includes: a first terminal sending a key information acquisition message to a second terminal, wherein the key information is used to unlock the first terminal; and the first terminal unlocking the screen of the first terminal according to the key information from the second terminal. By using the embodiment of the present document, it solves the problem that, when the screen cannot be unlocked since the user forgets the password, the version needs to be upgraded to unlock the screen, resulting in a waste of time and a loss of important data in the terminal caused by upgrading the version, the user can unlock the terminal according to standby key information, thus avoiding the situation in which the terminal cannot be unlocked since the unlocking code of the terminal is forgotten, and further improving the ease for using the terminal.

8 Claims, 5 Drawing Sheets

(51) Int. Cl.
*G06F 21/31* (2013.01)
*H04L 9/08* (2006.01)
*H04W 12/04* (2009.01)
*H04W 12/06* (2009.01)
*H04L 29/06* (2006.01)

(56) References Cited

FOREIGN PATENT DOCUMENTS

| | | |
|---|---|---|
| CN | 102930188 A | 2/2013 |
| EP | 2437198 A1 | 4/2012 |

* cited by examiner

SCREEN UNLOCKING METHOD, DEVICE AND TERMINAL

TECHNICAL FIELD

The present document relates to the field of communications, and more particularly, to a screen unlocking method, device and terminal.

BACKGROUND

Currently, various types of terminals have been playing an increasingly important role in our lives, and with the growing popularity of intelligent machines, intelligent terminals and mobile terminals have played an increasingly important role in our daily lives. The security issue of intelligent terminals has also been highlighted, and all of the existing intelligent terminals provide a function of selectively setting screen locking, such as pattern unlocking, PIN unlocking, password unlocking, and so on, which meet their own individualizations to ensure the privacy of the terminals. Usually if you set these unlocking modes but later forget the unlocking pattern or the unlocking password set by yourself, you need to restore it by upgrading its version via an appropriate after-sales service site, which not only wastes the time, but also results in a loss of important data in the terminal because of upgrading the version.

SUMMARY

The embodiment of the present document provides a screen unlocking method, device and terminal, to at least solve the problem in the related art that, the screen cannot be unlocked because the user forgets the password, then the version needs to be upgraded to unlock the screen, but the method not only is a waste of time, but also results in a loss of important data in the terminal caused by upgrading the version.

According to one aspect of the embodiment of the present document, a screen unlocking method is provided, comprising: a first terminal sending a key information acquisition message to a second terminal, wherein the key information is used to unlock the first terminal; the first terminal unlocking the screen of the first terminal according to the key information from the second terminal.

Preferably, the first terminal sending the key information acquisition message to the second terminal comprises: the first terminal judging whether a current number of unlocking times reaches a preset number of unlocking times or not; if yes, sending the key information acquisition message to the second terminal.

Preferably, the first terminal unlocking the screen of the first terminal according to the key information from the second terminal comprises: the first terminal judging whether the key information from the second terminal matches with key information stored in the first terminal or not; if yes, unlocking the screen of the first terminal.

Preferably, after the screen of the first terminal is unlocked successfully, further comprising: the unlocking password of the first terminal being reset back to a no-password state.

Preferably, the method further comprises: encrypting and sending the key information acquisition message to the second terminal; decrypting the key information from the second terminal and sending it to the first terminal, the first terminal judging whether the decrypted key information matches with the key information stored within the first terminal or not; and if yes, unlocking the screen of the first terminal.

According to one aspect of the embodiment of the present document, a screen unlocking method is provided, comprising:

after receiving a key information acquisition message from a first terminal, a second terminal prompting the user to input a verification code;

the second terminal receiving the verification code input by the user for obtaining the key information, judging whether the verification code matches with the verification code preset in the second terminal or not;

if yes, sending the key information to the first terminal, wherein the key information is used to unlock the first terminal.

Preferably, the second terminal sending the key information to the first terminal comprising:

the second terminal taking out the key information stored in the second terminal and sending the key information to the first terminal according the key information acquisition message.

According to another aspect of the embodiment of the present document, a screen unlocking device is provided and located in a first terminal, comprising: a sending module, configured to send a key information acquisition message to a second terminal, wherein the key information is used to unlock the first terminal; an unlocking module, configured to unlock the screen of the first terminal according to the key information from the second terminal.

Preferably, the sending module comprises: a first judging unit, configured to judge whether a current number of unlocking times reaches a preset number of unlocking times or not; a sending unit, configured to send the key information acquisition message to the second terminal in the case that the current number of unlocking times reaches the preset number of unlocking times.

Preferably, the unlocking module comprises: a second judging unit, configured to judge whether the key information from the second terminal matches with the key information stored within the first terminal or not; an unlocking unit, configured to unlock the screen of the first terminal in the case that they match.

According to a further aspect of the embodiment of the present document, a terminal is provided, comprising: the screen unlocking device of any one of the abovementioned items.

According to a still further aspect of the embodiment of the present document, a terminal is provided, comprising:

a first receiving module, configured to prompt the user to input a verification code after receiving a key information acquisition message from a first terminal;

an authenticating module, configured to receive the verification code input by the user for obtaining the key information, judge whether the verification code matches with a verification code preset in the second terminal or not, and send a judgment result to a sending module;

the sending module, configured to send the key information to the first terminal if the judgment result is that they match, wherein the key information is used to unlock the first terminal.

Preferably, the terminal further comprises:

a storing module, configured to pre-store the key information of the first terminal;

the sending module, configured to send the key information to the first terminal, comprising:

the sending module taking out the key information pre-stored in the storing module according to the key information acquisition message, and sending the key information to the first terminal.

The embodiment of the present document uses the following method: obtaining the key information for unlocking the screen of the first terminal from the second terminal, and using the key information to unlock the screen of the first terminal. The embodiment of the present document can be used to solve the problem that, the screen cannot be unlocked since the user forgets the password, then the version needs to be upgraded to unlock the screen, but the method not only is a waste of time, but also results in a loss of important data in the terminal caused by upgrading the version, the user can unlock the terminal according to a standby key information, thereby avoiding the situation in which the terminal cannot be unlocked since the terminal unlocking code is forgotten, and further improving the ease for using the terminal.

BRIEF DESCRIPTION OF THE DRAWINGS

The accompanying drawings described herein are used to provide a further understanding of the present document and constitute a part of this application, exemplary embodiments of the present document and their descriptions are used for explaining the present document and do not constitute an improper limit on the present document. In the accompanying drawings.

PREFERRED EMBODIMENTS OF THE DOCUMENT

Hereinafter in conjunction with the accompanying drawings and embodiments, the present document will be described in detail. It should be noted that in the case of no conflict, embodiments and features in the embodiments of the present application may be combined with each other.

Figure 1:
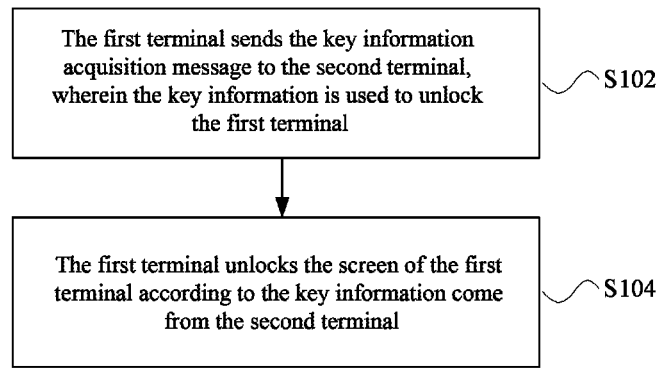
FIG. 1 is a flow chart of a screen unlocking method in accordance with an embodiment of the present document.

According to the existing unlocking scheme, if a user forgets the password or the unlocking pattern, there will exist a lot of inconveniences, to solve the abovementioned problem, the present embodiment provides a screen unlocking method, and the flow chart of the process is shown in FIG. 1, comprising the following steps.

In step S102, the first terminal transmits a key information acquisition message to the second terminal, wherein the key information is used to unlock the first terminal;

In step S104, the first terminal unlocks the screen of the first terminal according to the key information from the second terminal.

The present embodiment uses the following method: obtaining the key information for unlocking the screen of the first terminal from the second terminal, and unlocking the screen of the first terminal with the key information. By using the present embodiment, the problem that the screen cannot be unlocked since the user forgets the password, and the version needs to be upgraded to unlock the screen, but the method is a waste of time and results in the loss of important data in the terminal caused by upgrading the version, is solved, and the user can unlock the terminal according to the standby key information, thereby avoiding the situation in which the terminal cannot be unlocked since the unlocking code of the terminal is forgotten, and further improving the ease for using the terminal.

In the process of implementing the step S102, the first terminal sending the key information acquisition message to the second terminal may comprise the following processing process: the first terminal judging whether the current number of unlocking times reaches a preset number of unlocking times or not; if it reaches or exceeds the preset number of unlocking times, then sending the key information acquisition message to the second terminal.

After step 102, the following steps are further comprised.

In step 202, after the second terminal receives the key information acquisition message, the second terminal pops up a prompt box allowing the user to input a verification code, and the user can input the previously agreed verification code.

The process of inputting the verification code prevents anyone else from maliciously stealing the first terminal information, and further protects the information security of the first terminal user.

In step 204, the second terminal receives the verification code input by the user for obtaining the key information; judges whether the verification code matches with a verification code preset in the second terminal or not, if the verification codes match, it is to execute step 206, otherwise end the process of sending the key information.

In step 206, in the case that the verification code is correct, the second terminal sends the key information to the first terminal.

Wherein, the second terminal takes out the key information pre-stored in the second terminal according to the key information acquisition message come from the first terminal, and then sends the key information to the first terminal.

If the verification code is incorrect, then end the process of sending the key information. Of course, the number of times of inputting the verification code can be restricted, such as three times, and if the verification code is still wrong for the third time, then end the process.

In step 104, after the first terminal receives the key information, the first terminal unlocks the screen of the first terminal according to the key information from the second terminal, and the process may comprise the following process: the first terminal judging whether the key information from the second terminal matches with the key information stored in the first terminal or not; if they match, unlocking the screen of the first terminal, that is, the screen of the first terminal is successfully unlocked. Otherwise, the unlocking process ends.

After the screen of the first terminal is unlocked successfully, the unlocking password of the first terminal is reset back to the no-password state, and the user can choose to set a new password or not as needed, wherein, there may be various types of passwords, such as voice password, digital password, and pattern password.

When the first terminal sends the key information acquisition message to the second terminal, the first terminal or the network may encrypt and then send the message to the second terminal; likewise, when receiving the key information, the first terminal or the network can decrypt it, and then perform the matching process.

By using the abovementioned method, after the user forgets the unlocking password, other means (such as sending the standby unlock code) still can be used to unlock, thus saving the time for updating the version after the sale, and improving the efficiency.

First Preferred Embodiment

The present embodiment provides a screen unlocking method between terminals, that is, unlock and restore the original settings mainly by presetting the key information (the security code) in another terminal and encrypting and sending it through the network. The implementation of the present embodiment can overcome the problem in the process of using the mobile terminal that, the user forgets the screen unlocking pattern or password and can unlock the screen properly, thus causing a lot of disadvantages on user operations. The process of the method is as follows.

After the standby security unlocking code is preset, the terminal has the security unlocking function. After the preset unlocking pattern is forgot for the terminal, its feature cord can be sent to another terminal through the network. The other terminal then sends the previously preset standby security code to the locked terminal through the network. After the locked terminal receives the standby unlocking code sent through the network and the code matches, the unlocking is taken into effect, and the screen can be unlocked successfully, meanwhile the previous unlocking pattern is reset, that is, the current terminal has no unlocking pattern or password by default.

Using the abovementioned method and device according to the present embodiment, background applications can be automatically cleared regularly in accordance with the needs customized by the user, which not only saves the memory currently used by the mobile terminal, but also avoids the significant effect on the system performance because the background applications are suspended for a long term.

In the following, the present preferred embodiment will be further described in conjunction with the accompanying drawings.

Figure 2:
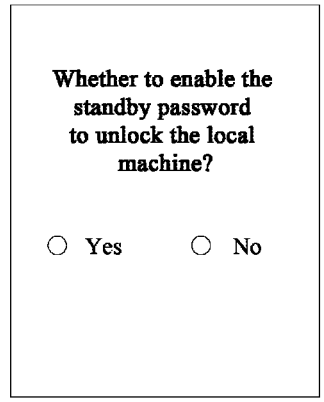
FIG. 2 is the first schematic diagram of an initial setting interface in accordance with the first preferred embodiment of the present document.
Figure 3:
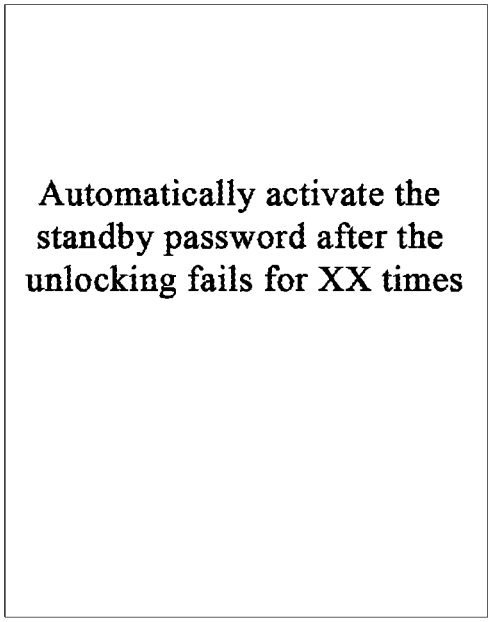
FIG. 3 is the second schematic diagram of the initial setting interface in accordance with the first preferred embodiment of the present document.
Figure 4:
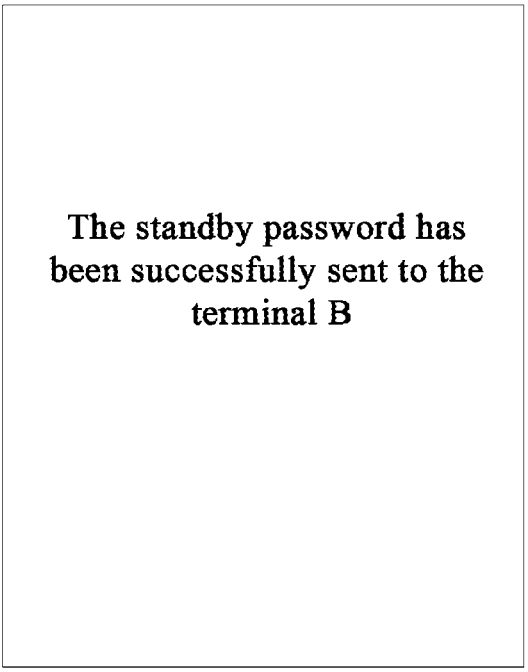
FIG. 4 is the third schematic diagram of the initial setting interface in accordance with the first preferred embodiment of the present document.

The terminal related to the present preferred embodiment is a mobile terminal, and the mobile terminal supports functions of locking screen with a password or pattern. FIG. 2, FIG. 3 and FIG. 4 are schematic diagrams of an initial setting interface according to the present embodiment, comprising the following.

In FIG. 2, before setting the power-on unlocking password for the terminal, the user is prompted whether to set a standby power-on unlocking code, also known as the second power-on unlocking code or security key. The user can choose yes or no to carry out relevant subsequent operations.

In FIG. 3, the user can set the number of unlocking failure times after which a process of enabling the standby password activation is activated, and when setting the number, the default value can be set as 5 or 3, and the setting is according to the user needs, but the number is set smaller, the effect is better.

In FIG. 4, after the user successfully sets up the standby unlocking code, there is still a prompt of "the standby password is successful sent to the terminal XX" on the terminal.

Figure 5:
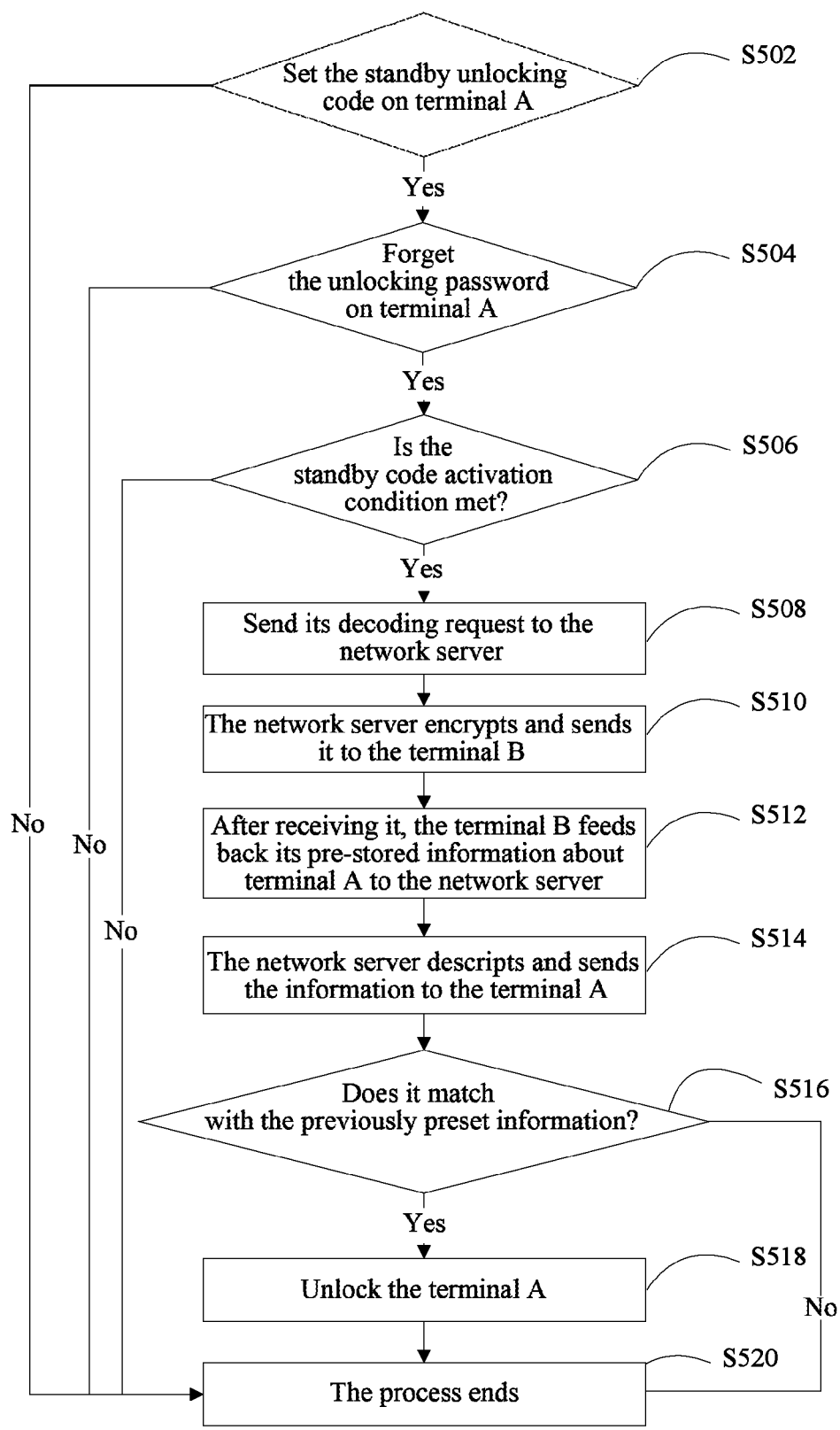
FIG. 5 is a flow chart of a screen unlocking method in accordance with the first preferred embodiment of the present document.

FIG. 5 comprises steps S502 to step S520 according to the flow chart of the method in the present embodiment.

In step S502, it is to judge whether the mobile terminal has been set a standby password (the standby password herein can be one of the key information) or note. If the standby password has already been set, then it is to proceed to step S504, and if the standby unlocking password has not been set yet, then proceed to step S520.

In step S504, it is to further judge whether the mobile terminal user has forgotten the unlocking password or not, if the user has forgotten the unlocking password set initially, then proceed to the process S506, and if the user has not forgotten the initial password, then execute step S520, and then enter into the normal password or pattern unlocking program.

In step S506, it is to judge whether the mobile terminal at this time meets the condition of enabling the standby password activation or not. Wherein, the abovementioned condition can be that the number of unlocking times reaches or exceeds a preset number of unlocking times. Once the condition is met, it is to execute step S508, and if the triggering condition is not met, then execute step S520. Wherein, the condition of enabling the standby password activation is consistent with the condition of enabling the standby password after the number of unlocking failures set in FIG. 2.

In step S508, it is to send the standby password unlocking request to the network server. Wherein, the abovementioned web server can be a network server from a communication operator, or from a terminal manufacturer, or purchased from the third-party company, and there are no specific restrictions, as long as it has the specific functions Of course, the network herein is a generalized network, such as a mobile communication network, or a network connected with Bluetooth.

In step S510, the network server uses its own encryption unit to encrypt and send a reminder of triggering the standby password to the terminal B. In the process of implementing this step, encrypting the to-be-sent standby password unlocking request will greatly improve the security of the data to be sent.

In step S512, after receiving the reminder of triggering the standby password sent by the network server, the terminal B takes out the previously stored standby unlocking password information from the storing unit and feeds it back to the network server.

Before implementing the step, an interface of prompting to input the verification code can also be popped up on the terminal B when receiving the standby password unlocking request, and inputting the verification code further enhances the security of unlocking the screen of the terminal A, thus preventing anyone else from maliciously unlocking and stealing the user data. After the user inputs the correct verification code at the terminal B, then it is to execute the step S512, and take out the pre-stored unlocking password information.

In step S514, the network server then sends the standby unlocking code fed back by the terminal B to the terminal A through the decrypting unit.

In step S516, the terminal A at this time will judge whether the standby unlocking password sent from the terminal B matches with the preset standby unlocking password or not. If the match is successful, it is to execute step S518. If the match fails, it is to execute the step S520.

In step S518, the terminal A successful unlocks and gives a UI (User Interface) prompt.

In step S520, the process ends. Depending on different operations, the reasons of ending the process are different, the terminals A and B can pop up a variety of prompts for various reasons, for example, if the match is not successful in step S516, it is to display "the unlocking with the standby unlocking code is failed" on the terminal A.

Figure 6:
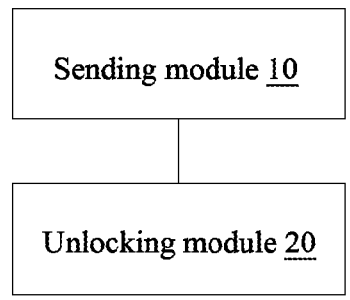
FIG. 6 is a block diagram of a screen unlocking device in accordance with an embodiment of the present document.

The embodiment of the present document further provides a screen unlocking device, and the device may be located at the first terminal, and its block diagram is shown in FIG. 6, comprising: sending module 10, configured to send a key information acquisition message to the second terminal, wherein the key information is configured to unlock the first terminal; unlocking module 20, connected with the sending module 10 and configured to unlock the screen of the first terminal according to the key information from the second terminal.

Figure 7:
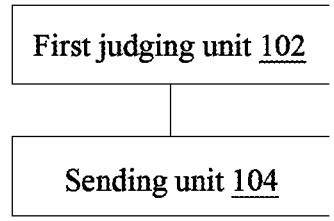
FIG. 7 is a block diagram of a sending module in the screen unlocking device in accordance with an embodiment of the present document

FIG. 7 shows a block diagram of the sending module 10, comprising: first judging unit 102, configured to judge whether the current number of unlocking times reaches a preset number of unlocking times or not; sending unit 104, connected with the first judging unit 102, and configured to send the key information acquisition message to the second terminal when the current number of unlocking times reaches the preset number of unlocking times.

Figure 8:
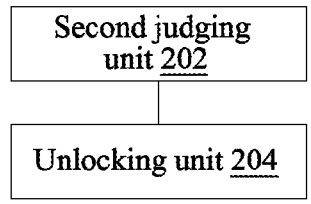
FIG. 8 is a block diagram of an unlocking module in the screen unlocking device in accordance with an embodiment of the present document.

In the implementation, the unlocking module 20 may also be shown as FIG. 8, comprising: second judging unit 202, configured to judge whether the key information from the second terminal matches with the key information stored in the first terminal or not; unlocking unit 204, connected with the second judging unit 202, and configured to unlock the screen of the first terminal in the case that they match.

Figure 9:
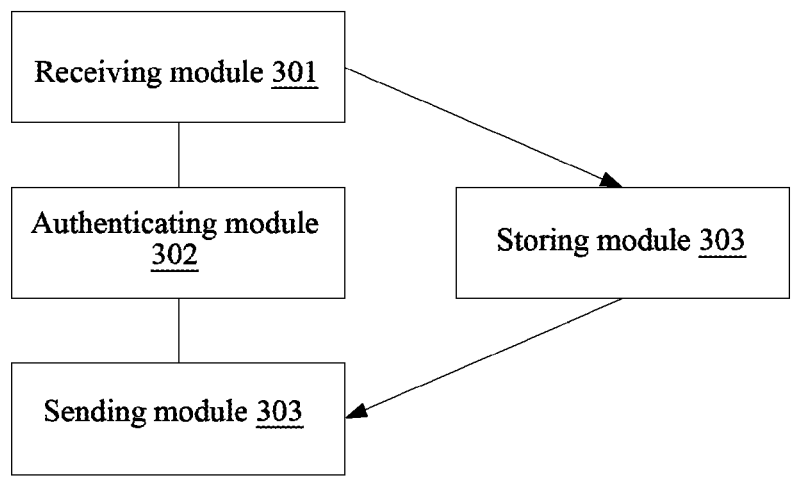
FIG. 9 is a block diagram of the second terminal in accordance with an embodiment of the present document.

Preferably, the present embodiment further provides the second terminal, FIG. 9 shows a block diagram of the second terminal, comprising: receiving module 301, configured to prompt the user to input the verification code after receiving the key information acquisition message from the first terminal; authenticating module 302, configured to be a module which receives the verification code input by the user for obtaining the key information, and judges whether the verification code matches with the verification code preset in the second terminal or not; sending module 303, configured to be a module which sends the key information to the first terminal under the condition that the verification code is correct.

In the implementation, the second terminal further comprises: storing module 304, configured to pre-store the key information of the first terminal;

the sending module 303 is configured to take out the key information pre-stored in the storing module 304 and send the key information to the first terminal according to the key information acquisition message come from the first terminal.

Hereinafter, in conjunction with the preferred embodiments, the abovementioned device and terminal will be described, in the preferred embodiment described in the following, the terminal is an intelligent mobile terminal, wherein the name of each module is slightly different from each of the respective abovementioned modules, but it can achieve the same functionality.

Second Preferred Embodiment

Figure 10:
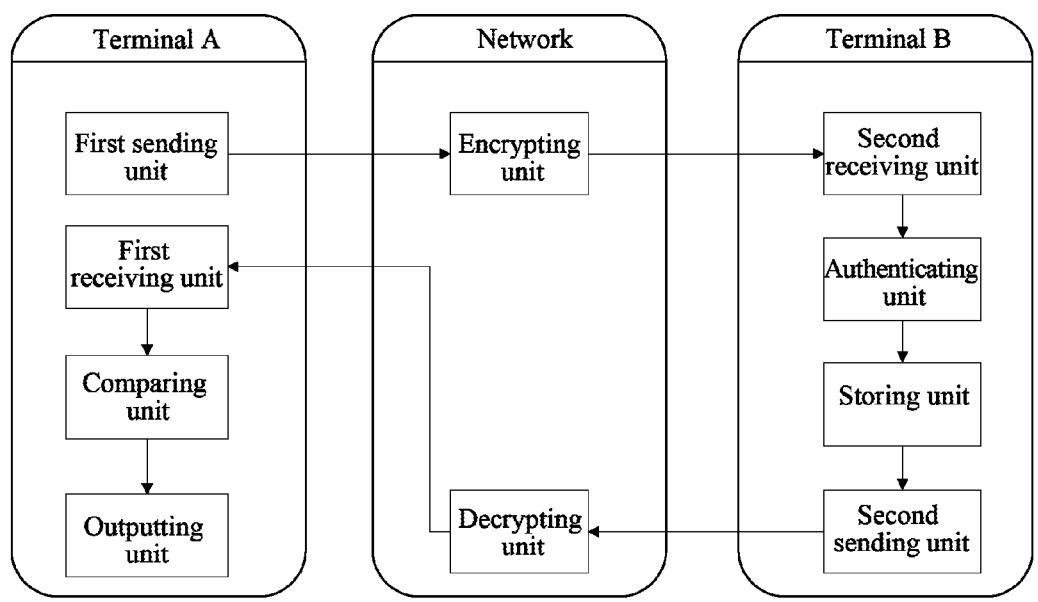
FIG. 10 is a block diagram of a system in accordance with the second preferred embodiment of the present document.

The present embodiment provides a mobile terminal, which supports providing a standby password to unlock, thus avoiding the problem of losing data and files since the user has to go to the business hall to upgrade the version after forgetting the password. FIG. 10 is a block diagram of the mobile terminal A, the network and the mobile terminal B according to the present embodiment, and the terminal A comprises the following units:

the first sending unit, used to send an unlocking request to the terminal B through the network after the mobile terminal meets the condition of enabling the standby unlocking code.

the first receiving unit, which corresponds to the first sending unit and used by the mobile terminal for receiving and forwarding the standby unlocking code to a storing unit.

A comparing unit, which is mainly used for the function of judging some triggering conditions and the comparison function when unlocking with the standby code; such as, judging whether the standby unlocking function is enabled or not, and whether the condition of enabling the standby unlocking function is met or not.

A outputting unit, which provides a visual displaying mode which can use a UI interface to operate as well as feed back a result generated by the corresponding operation between the users. For example, some initialization settings performed before the user enables the function, as well as some prompts after enabling the device.

The network server in the network comprises: an encrypting unit, mainly used for performing encrypting and setting operations on the unlocking code during the transmission process, so as to be make it more secure in the transmission process.

The decrypting unit corresponds to the encryption unit, and is primarily used to perform decrypting and setting operations on the unlocking code during the transmission process, so as to be used in the unlocking process.

The terminal B comprises the following units: the second receiving unit, used for receiving the key information acquisition message.

A storing unit is used to open up a storage space for the standby unlocking password in the mobile terminal and save it.

The second sending unit is used by the terminal B to use this unit to send the key information to the terminal A which is to be unlocked.

An authenticating unit provides a protection for the identity after the condition of activating the standby password is met, so as to prevent anyone else from using the standby unlocking code to unlock.

The embodiment of the present document uses the user customization mode to make the user freely set the standby password, including the condition of enabling the standby key, and has great security and can facilitate the user enabling the standby password to unlock the terminal in the case that the user forgets the unlocking password and, thus avoiding the case that the terminal cannot be unlocked because the user forgets the unlocking code of the terminal, and increasing the ease-for-use and user experience of the mobile terminal.

From the above description, it can be seen that the present document achieves the following technical effects:

the present embodiment uses the following method: obtaining the key information from the second terminal for unlocking the screen of the first terminal, and using the key information to unlock the screen of the first terminal. By using the present embodiment, the problem that the screen cannot be unlocked since the user forgets the password, then the version needs to be upgraded to unlock the screen, but the method is a waste of time and also results in a loss of important data in the terminal caused by upgrading the version, can be solved, the user can unlock the terminal according to the standby key information, thereby avoiding the situation in which the terminal cannot be unlocked because the unlocking code of the terminal is forgotten, and further improving the ease for using the terminal.

Obviously, a person skilled in the art should understand that the respective modules or steps of the present document can be implemented with general-purpose computing devices, they can be concentrated on a single computing device or distributed in a network consisting of multiple computing devices, alternatively, they may be executed by program codes executable by computing devices, so that they can be stored in storage means and executed by computing devices, and in some cases, the illustrated or described steps can be performed in a different order, or they can be made into individual integrated circuit modules, or some of the modules or steps can be made into a single integrated circuit module to implement. Therefore, the present document is not limited to any specific hardware and software combination.

The above description is only preferred embodiments of the present document and is not used to limit the present document, and for a person skilled in the art, any modifications, equivalent replacements and improvements made within the spirit and principle of the present document should be included within the protection scope of the present document.

INDUSTRIAL APPLICABILITY

The embodiment of the present document uses the following method: obtaining the key information for unlocking the screen of the first terminal from the second terminal, and using the key information to unlock the screen of the first terminal. The embodiment of the present document can be used to solve the problem that, the screen cannot be unlocked since the user forgets the password, then the version needs to be upgraded to unlock the screen, but the method not only is a waste of time, but also results in a loss of important data in the terminal caused by upgrading the version, the user can unlock the terminal according to a standby key information, thereby avoiding the situation in which the terminal cannot be unlocked since the terminal unlocking code is forgotten, and further improving the ease for using the terminal.

What is claimed is:

1. A screen unlocking method, comprising:
a first mobile terminal sending a key information acquisition message directly to a second mobile terminal, wherein the key information is used to unlock the first mobile terminal;
the first mobile terminal unlocking a screen of the first mobile terminal according to the key information directly from the second mobile terminal; wherein the first mobile terminal unlocking the screen of the first mobile terminal according to the key information directly from the second mobile terminal comprises:
the first mobile terminal judging whether the key information directly from the second mobile terminal matches with key information stored in the first mobile terminal or not;
when yes, unlocking the screen of the first mobile terminal;
wherein the first mobile terminal sending the key acquisition message directly to the second mobile terminal comprises:
the first mobile terminal judging whether a current number of unlocking times reaches a preset number of unlocking times or not; and
when yes, sending the key information acquisition message to the second mobile terminal.

2. The method of claim 1, wherein, after the screen of the first mobile terminal is unlocked successfully, the method further comprises:
an unlocking password of the first mobile terminal being reset back to a no-password state.

3. The method of claim 1, further comprising:
encrypting and sending the key information acquisition message directly to the second mobile terminal; and
decrypting the key information directly from the second mobile terminal, then judging whether the decrypted key information matches with the key information stored within the first mobile terminal or not; and if yes, unlocking the screen of the first mobile terminal.

4. A screen unlocking method, comprising:
after receiving a key information acquisition message directly from a first mobile terminal, a second mobile terminal prompting a user to input a verification code;
the second mobile terminal receiving the verification code input by the user for obtaining the key information, and judging whether the verification code matches with a verification code preset in the second mobile terminal or not;
when yes, sending the key information directly to the first mobile terminal, wherein, the key information is used to unlock the first mobile terminal;
wherein the second mobile terminal sending the key information directly to the first mobile terminal comprises:
the second mobile terminal taking out the key information previously stored in the second mobile terminal and sending the key information directly to the first mobile terminal according the key information acquisition message;
wherein said receiving a key information acquisition message directly from a first mobile terminal comprises:
the first mobile terminal judging whether a current number of unlocking times reaches a preset number of unlocking times or not;
when yes, the key information acquisition message is sent to the second mobile terminal.

5. A screen unlocking device, located in a first mobile terminal, and comprising a processor, and a storage device for storing computer executable instructions that when executed by the processor cause the processor to perform steps in the following modules:
a sending module, configured to send a key information acquisition message directly to a second mobile terminal, wherein the key information is used to unlock the first mobile terminal;
an unlocking module, configured to unlock the screen of the first mobile terminal according to the key information from the second mobile terminal;
wherein the unlocking module comprises:
a second judging unit, configured to judge whether the key information from the second mobile terminal matches with the key information stored within the first mobile terminal or not; and an unlocking unit, configured to unlock the screen of the first mobile terminal in the case that they match;
wherein the sending module comprises:
a first judging unit, configured to judge whether a current number of unlocking times reaches a preset number of unlocking times or not;
a sending unit, configured to send the key information acquisition message directly to the second mobile terminal in the case that the current number of unlocking times reaches the preset number of unlocking times.

6. A terminal, comprising: the screen unlocking device of claim 5.

7. A terminal, comprising a processor, and a storage device for storing computer executable instructions that when executed by the processor cause the processor to perform steps in the following modules:

a receiving module, configured to prompt a user to input a verification code after receiving a key information acquisition message from a first mobile terminal;

an authenticating module, configured to receive the verification code input by the user for obtaining the key information, judge whether the verification code matches with a verification code preset in the second mobile terminal or not, and send a judgment result to a sending module;

the sending module, configured to send the key information directly to the first mobile terminal if the judgment result is that they match, wherein the key information is used to unlock the first mobile terminal;

wherein the terminal further comprises:

a storing module, configured to pre-store the key information of the first mobile terminal;

the sending module, configured to send the key information directly to the first mobile terminal, comprising:

the sending module taking out the key information pre-stored in the storing module according to the key information acquisition message, and sending the key information directly to the first mobile terminal;

wherein said receiving a key information acquisition message directly from a first mobile terminal comprises:

the first mobile terminal judging whether a current number of unlocking times reaches a preset number of unlocking times or not;

when yes, the key information acquisition message is sent to the second mobile terminal.

8. A terminal, comprising: the screen unlocking device of claim 7.

* * * * *